US009087539B2

(12) United States Patent
Argumedo et al.

(10) Patent No.: US 9,087,539 B2
(45) Date of Patent: Jul. 21, 2015

(54) DEVICE AND METHOD FOR CONTROLLING THE POSITION OF A HEAD RELATIVE TO A TAPE WITHIN A TAPE TRANSPORT SYSTEM

(71) Applicant: INTERNATIONAL BUSINESS MACHINES CORPORATION, Armonk, NY (US)

(72) Inventors: Armando J Argumedo, Tucson, AZ (US); Nhan X Bui, Tucson, AZ (US); David H Harper, Vail, AZ (US); Randy C Inch, Tucson, AZ (US); Kevin B Judd, Tucson, AZ (US); Mark A Lantz, Adliswil (CH); Angeliki Pantazi, Thalwil (CH); Tomoko Taketomi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/315,427

(22) Filed: Jun. 26, 2014

(65) Prior Publication Data
US 2015/0009590 A1 Jan. 8, 2015

(30) Foreign Application Priority Data
Jul. 4, 2013 (GB) .................................. 1311965.6

(51) Int. Cl.
G11B 5/584 (2006.01)
(52) U.S. Cl.
CPC ...................................... G11B 5/584 (2013.01)
(58) Field of Classification Search
None
See application file for complete search history.

(56) References Cited

U.S. PATENT DOCUMENTS 7,684,144 B1 * 3/2010 Goker et al. ............... 360/77.12
8,089,716 B2    1/2012 Takayama et al.
8,213,105 B2    7/2012 Bui et al.
(Continued)

OTHER PUBLICATIONS

Lanze et al., Servo-Pattern Design and Track-Following Control for Nanometer Head Positioning on Flexible Tape Media, IEEE Transactions on Control Systems Technology, Mar. 2, 2012, pp. 369-381, vol. 20, http://ieeexplore.ieee.org/xpl/login.jsp?tp=&arnumber=6118309&url=http%3A%2Fieeexplore.ieee.org%2Fxpls%2Fabs_all.jsp%3Farnumber%3D6118309.
(Continued)

Primary Examiner — K. Wong
(74) Attorney, Agent, or Firm — Tutunjian & Bitetto, P.C.; Jeff Tang

(57) ABSTRACT

Controlling the position of a head within a tape transport system. A track-follow control system (TFCS) includes a controller device for generating a control signal as a function of a position error signal (PES), wherein the PES indicates a difference between the actual and target positions of the head relative to the tape, and an actuator for changing the actual position. The TFCS is adapted to select a controller device configuration from a plurality of configurations dependent on an operating tape speed. The configurations are predetermined depending on a vibration frequency domain profile indicative of environmental vibrations induced to the head and tape to determine the control signal for adjusting an actuator output signal relative to a lateral tape motion signal. The TFCS is also adapted to feed-back a signal depending on a difference of the actuator output signal and the lateral tape motion signal to generate the PES.

20 Claims, 9 Drawing Sheets

(56) References Cited

U.S. PATENT DOCUMENTS

| | | |
|---|---|---|
| 2011/0043945 A1 | 2/2011 | Cherubini et al. |
| 2011/0102934 A1 | 5/2011 | Bui et al. |
| 2011/0267717 A1 | 11/2011 | Cherubini et al. |
| 2012/0008232 A1 | 1/2012 | Fasen |
| 2012/0087031 A1 | 4/2012 | Goker et al. |
| 2012/0307391 A1 | 12/2012 | Bui et al. |
| 2012/0307402 A1 | 12/2012 | Bui et al. |

OTHER PUBLICATIONS

Pantazi et al., Track-following in tape storage: Lateral tape motion and control, Mechatronics, Apr. 2012, pp. 361-367, vol. 22—Issue 3, http://www.sciencedirect.com/science/article/pii/S0957415811001231.

* cited by examiner

DEVICE AND METHOD FOR CONTROLLING THE POSITION OF A HEAD RELATIVE TO A TAPE WITHIN A TAPE TRANSPORT SYSTEM

CROSS-REFERENCE TO RELATED APPLICATION

This application claims priority under 35 U.S.C. §119 from United Kingdom Patent Application No. 1311965.6 filed Jul. 4, 2013, the entire contents of which are incorporated herein by reference.

BACKGROUND OF THE INVENTION

The present invention relates generally to tape storage systems. More specifically, the present invention relates to a device and method for controlling the position of a head relative to a tape within a tape transport system, considering lateral tape motion and environmental vibrations.

In modern tape storage systems, the capacity and performance of the tape storage systems have increased considerably. However, to achieve higher cartridge or tape capacities and improved performance, further advances in several areas are necessary. Increases in linear and track densities on the tape can be required in order to achieve higher storage capacities. However, an increase in linear densities can lead to a decrease of the distance between adjacent bit cells, which in turn can lead to an increase of inter-symbol interferences. An increase in track densities can lead to narrower individual track widths and narrower write and/or read heads, which in turn can require very precise control of the tape transport system and track-follow control of the tape head.

To achieve the required track densities, precise positioning of the recording head over the data tracks can be required. Therefore, the performance of the track-follow control system of tape drives needs to be improved. Furthermore, operation of tape drive systems requires robust performance of the track-follow control system under shock and vibration conditions. Increasing the tape track density tightens further the tolerance in the acceptable track following error, making it increasingly more challenging to meet the performance specifications under vibration conditions.

The basic function of the track-follow control system is to reduce the misalignment between the tape and the recording head created by lateral motion of the flexible medium. Lateral tape motion (LTM) arises primarily from imperfections in the tape guide rollers and reels (e.g., such as run-outs, eccentricities, and other tape path imperfections).

Besides compensating for the LTM, the track-follow control system can provide an additional functionality of compensating for the external vibration disturbances. Conventionally, standard vibration profiles are used to describe the vibration specifications in terms of the acceleration input under which the tape drive must continue to operate reliably.

To accommodate different data rate requirements the tape drive needs to operate in a wide range of tape speeds. Operation at different tape speeds creates conflicting requirements in the track-follow control system. For example, the LTM disturbance frequency increases with tape speed. Therefore, to compensate for LTM at high speeds a higher bandwidth controller is needed to follow with the same accuracy. On the other hand the servo pattern delay increases with decreasing speed. In this case, a lower bandwidth controller is needed to avoid closed-loop disturbance amplification. Further, a high-bandwidth controller is needed to improve performance under vibration conditions at all speeds.

Current solutions address individual problems. For example, compensation of the high frequency LTM components can be achieved by increasing the controller bandwidth. With this approach though, there is a trade-off between the performance improvements by compensating the disturbance and the delay effects at low tape speeds. Several approaches have been proposed for improving performance under vibration condition such as switching controllers, accelerometer measurements, and disturbance observer enhancements. Controllers in this context refer to devices for controlling an actuator being responsible for actuating the head (i.e. to change the position of the head). For different vibration conditions, different controllers can be used (i.e. controllers having configurations customized to the current vibration condition). Depending on the vibration condition, the control signal for the actuator can be generated and adjusted so that the vibration condition is considered when actuating the head. However, in order to consider different vibration conditions, the kind of controller can be chosen. A system using switching between controllers is for example disclosed in US 2012/0307391 A1.

SUMMARY OF THE INVENTION

Accordingly, one aspect of the present invention provides a track-follow control system for controlling the position of a head relative to a tape within a tape transport system, the track-follow control system including: a controller device for generating a control signal as a function of a position error signal, wherein the position error signal indicates a difference between an actual position of the head and a target position of the head relative to the tape; and an actuator for changing the actual position of the head dependent on the control signal; wherein the track-follow control system is adapted to: select a configuration for the controller device from a plurality of configurations dependent on an operating tape speed, wherein the plurality of controller device configurations are pre-determined depending on a vibration frequency domain profile indicative of environmental vibrations induced to the head and the tape; determine the control signal for adjusting an actuator output signal relative to a lateral tape motion signal indicative of a lateral motion of the tape; and feedback, to an input of the track-follow control system, a feedback signal depending on a difference of the actuator output signal and the lateral tape motion signal in order to generate the position error signal.

Another aspect of the present invention provides a tape transport system, including: a head operable to read data from and/or write data to the tape; and a track-follow control system for controlling the position of a head relative to a tape, the track-follow control system including: a controller device for generating a control signal as a function of a position error signal, wherein the position error signal indicates a difference between an actual position of the head and a target position of the head relative to the tape; and an actuator for changing the actual position of the head dependent on the control signal; wherein the track-follow control system is adapted to: select a configuration for the controller device from a plurality of configurations dependent on an operating tape speed, wherein the plurality of controller device configurations are pre-determined depending on a vibration frequency domain profile indicative of environmental vibrations induced to the head and the tape; determine the control signal for adjusting an actuator output signal relative to a lateral tape motion signal indicative of a lateral motion of the tape; and feedback, to an input of the track-follow control system, a feedback signal depending on a difference of the actuator output signal and the lateral tape motion signal in order to generate the position error signal.

Another aspect of the present invention provides a method for controlling the position of a head relative to a tape within a tape transport system, the method including: pre-determining a plurality of controller device configurations depending on a vibration frequency domain profile indicative of environmental vibrations induced to the head and the tape; selecting a configuration for a controller device from the plurality of configurations dependent on an operating tape speed; generating, by the controller device, a control signal as a function of a position error signal, wherein the position error signal indicates a difference between an actual position of the head and a target position of the head relative to the tape; changing, by an actuator, the actual position of the head dependent on the control signal; determining the control signal for adjusting an actuator output signal relative to a lateral tape motion signal indicative of a lateral motion of the tape; and feeding back, to an input of the track-follow control system, a feedback signal depending on a difference of the actuator output signal and the lateral tape motion signal in order to generate the position error signal.

Another aspect of the present invention provides a computer program product for controlling the position of a head relative to a tape within a tape transport system, the computer program product including a computer readable storage medium having program instructions embodied therewith, wherein the computer readable storage medium is not a transitory signal per se, the program instructions readable/executable by a computer device to cause the computer device to perform a method including: pre-determining a plurality of controller device configurations depending on a vibration frequency domain profile indicative of environmental vibrations induced to the head and the tape; selecting a configuration for a controller device from the plurality of configurations dependent on an operating tape speed; generating, by the controller device, a control signal as a function of a position error signal, wherein the position error signal indicates a difference between an actual position of the head and a target position of the head relative to the tape; changing, by an actuator, the actual position of the head dependent on the control signal; determining the control signal for adjusting an actuator output signal relative to a lateral tape motion signal indicative of a lateral motion of the tape; and feeding back, to an input of the track-follow control system, a feedback signal depending on a difference of the actuator output signal and the lateral tape motion signal in order to generate the position error signal.

BRIEF DESCRIPTION OF THE DRAWINGS

Similar or functionally similar elements in the figures have been allocated the same reference signs if not otherwise indicated.

DETAILED DESCRIPTION OF THE PREFERRED EMBODIMENT

Figure 1:
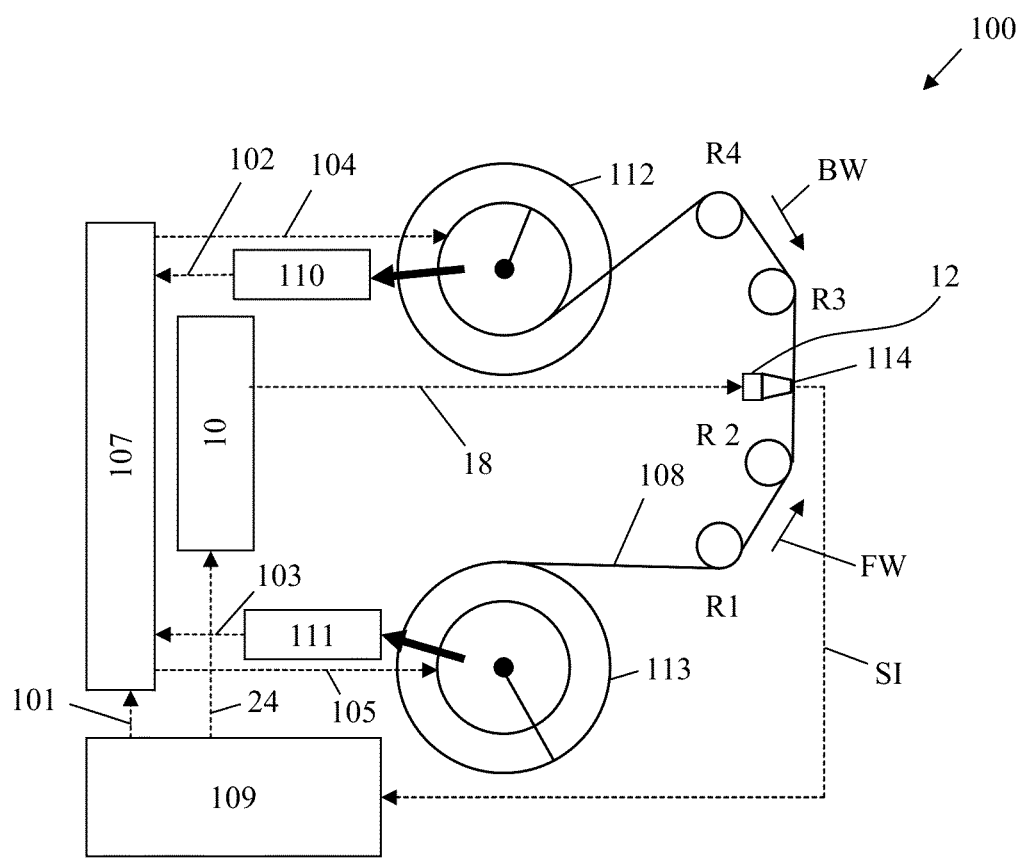
FIG. 1 shows a schematic block diagram of a tape transport system including a track-follow control system according to an embodiment of the present invention.

According to an embodiment of a first aspect of the present invention, a track-follow control system for controlling the position of a head relative to a tape within a tape transport system is provided. The track-follow control system includes a controller device for generating a control signal as a function of a position error signal, wherein the position error signal indicates a difference between the actual position of the head and a target position of the head relative to the tape, and an actuator for changing the actual position of the head dependent on the control signal. The track-follow control system is adapted to select a configuration for the controller device from a plurality of configurations dependent on an operating tape speed, wherein the plurality of controller device configurations are pre-determined (i.e., in advance) depending on a vibration frequency domain profile indicative of environmental vibrations induced to the head and the tape to determine the control signal for adjusting an actuator output signal relative to a lateral tape motion signal indicative of a lateral motion of the tape, and to feed back to an input of the track-follow control system a feedback signal depending on a difference of the actuator output signal and the lateral tape motion signal in order to generate the position error signal.

In tape transport systems, the tape is transported through a tape path from a cartridge reel to a take-up reel or vice versa. Guiding through the tape path and across a head is performed by rolling elements (so called rollers). The head is coupled to an actuator and dedicated servo transducers at the head read preformatted servo track information. Such a tape transport system can include two main control systems for tape transport and track-follow. A tape transport control system is responsible for the transport of the tape within the tape transport system.

One main task of the track-follow controller is to position the head actuator with high accuracy on the centerline of the data tracks, in particular in the presence of lateral tape motion (LTM) and other external disturbances. The positioning accuracy of the track-follow control system can allow an increase of the tape track density. During track-follow a position error signal (PES), which is created as a function of the servo pattern on the tape, is used to measure the misalignment of the head relative to the data track locations. Subsequently, the PES is used by the herein described track-follow control system to position the head using the actuator to follow the data tracks in the presence of tape disturbances. The PES can be calculated by adding or subtracting the actual or estimated relative position of the head (i.e. the feedback signal of the track-follow control system) to or from a track reference signal. The track reference signal includes information in view of the target position of the head relative to the tape. The relative position of the head with respect to the tape is calculated as a function of the recorded servo pattern, which can include magnetic transitions with two different slopes. The position can be calculated from the relative timing of pulses generated by the head reading the servo pattern (i.e. the magnetic transitions). The control device can generate the control signal in order to minimize the PES. Thus, the control signal includes information about a new position of the head being calculated in relation to the PES.

The relative position of the head with respect to the tape can be influenced by different parts of the tape transport system or can be influenced from the outside. For instance, the LTM creates misalignment of the head elements relative to the data track locations. Sources of the LTM, which is the main contributor to the PES, are mainly imperfections of the rollers and reels, such as run-outs, eccentricities and other tape path characteristics. The first two effects can appear as stationary and time-varying periodic disturbances in the track-follow control system. Furthermore, in flangeless tape drives, low-frequency disturbances are created as an additional contribution to LTM. Flangeless refer to the fact that, in tape transport systems, the tape is transported using rollers, which can be designed without flanges for restricting the lateral motion of the tape. Due to the missing motion restriction at the rollers, the additional disturbances can be created due to the movement of the tape at the reels.

Besides LTM, other factors can impact the track-follow performance. For example, vibrations being induced due to environmental disturbances and/or vibrations of the whole tape transport system, one example being building vibrations. Such vibrations are also taken into account in the herein described track-follow control system.

The track-follow control system according to embodiments of the present invention is adapted to select a controller device configuration based on an operating tape speed. The operating tape speed in this context is the tape speed measured at the head. For different tape speeds different controller device configurations can be used, each having system characteristics being adapted for the actual tape speed. The selection of the configuration of the controller can be performed by using the operating tape speed as input for selecting controller coefficients. Based on the controller coefficients, the controller can be adapted, i.e. the configuration can be selected. The configuration of the controller device can vary with the operating tape speed. For instance, the configuration can include bandwidth adjustment for the controller device wherein the bandwidth, i.e. the frequency bandwidth in which the controller device should be able to operate, can be set. A set of configurations can be stored and a specific configuration can be chosen in dependence of the operating tape speed.

In addition to the selection of a controller device configuration, the track-follow control system according to embodiments of the present invention is adapted to take into account the LTM and other environmental vibrations, which can influence the position of the tape and the head relative to each other. The characteristics of these influences can be used to determine the control signal forwarded to the actuator. As the track-follow control system is arranged as a closed-loop controller, the feedback signal depending on the difference of the actuator output signal and the lateral tape motion signal is forwarded to an input of the track-follow control system and is used for generating the PES as described above. The feedback signal includes information about an estimated relative position of the head with respect to the tape calculated by the difference of an actual position of the head, i.e. the output signal of the actuator, and the lateral tape position. The control signal, which controls the actuator to change the position of the head, is determined by taking into account disturbances which are caused by the environmental vibrations. Further, the control signal that adjusts the actuator output signal is determined by taking into account disturbances which are caused by the LTM.

Vibrations across all speeds can be taken into account and compensated using the vibration frequency domain profile. This vibration frequency domain profile can include information about vibrations in dependence on the location where the tape transport system is used or a general specification under which conditions the tape drive is required to function.

The position to be controlled can be a lateral position of the head relative to a longitudinal direction of the tape. Due to the LTM or environmental vibrations, the position of the head relative to or with respect to the tape can vary in lateral position. "Lateral" in this context can denote a direction being more or less perpendicular to the direction of the movement or transport of the tape.

According to an embodiment of the present invention, the track-follow control system is adapted to select a configuration for the controller such that the controller coefficients are adjusted dependent on the operating tape speed.

The configuration can depend on the coefficients and by selecting the coefficients, the controller device is configured. In a further embodiment, due to the dependence on the operating tape speed, a re-configuration of the controller is possible during the operation. That means that if the operating tape speed changes, the controller device configuration can be adapted or selected accordingly.

According to a further embodiment of the present invention, the track-follow control system is adapted to determine the control signal such that the actuator output signal follows the lateral tape motion signal. According to this embodiment, the control signal is adapted to control the actuator in a way that the output signal of the actuator follows the lateral tape motion signal. Thus, the position of the actuator and the head follow the position of the tape which varies due to the lateral tape motion.

According to a further embodiment of the present invention, the track-follow control system is adapted to pre-determine the controller device configuration depending on a system delay using a system delay model. In particular it is adapted to calculate the system delay as a function of a servo pattern delay of the tape and an actuator delay. According to this embodiment, the controller device configuration is determined by taking into account the system delay which arises from the servo pattern delay of the tape and an actuator delay. The servo pattern delay is speed-dependent and corresponds to a delay of the servo-pattern. The servo pattern delay increases with decreasing speed as the movement of the tape is too low so that the head might not be able to read the servo-pattern in a time as necessary. Further, the system delay can be induced due to an actuator delay which is speed-independent. The actuator delay can be caused due to a sampling time of the control system or limited bandwidth of the actuator driver circuitry. The system delay can be considered for generating the control signal.

According to a further embodiment of the present invention, the track-follow control system is adapted to determine the control signal by adjusting the actuator output signal relative to the lateral tape motion signal by enhancing the actuator output signal at predefined frequencies. Thus, a disturbance rejection can be enhanced at predefined frequencies. The LTM signal can have characteristics in frequency areas which need to be more compensated than other areas. The controller can adjust the whole actuator output signal, but with an enhanced amplitude at the predefined frequencies.

According to a further embodiment of the present invention, the predefined frequencies include roller rotation frequencies and/or harmonics of these frequencies. The roller rotation can cause enhanced disturbances at specific frequencies due to periodic inaccuracies of the rollers. These specific frequencies can be addressed by the disturbance rejection at predefined frequencies corresponding to the specific frequencies due to the roller rotation.

According to a further embodiment of the present invention, the predefined frequencies depend on the operating tape speed. The disturbances caused by roller rotation vary with the operating tape speed. Thus, the attenuation of these disturbances at the corresponding frequencies can also vary with the operating tape speed. An input parameter for the adjustment of the actuator output signal can therefore be the operating tape speed.

According to a further embodiment of the present invention, the track-follow control system is adapted to determine the control signal by adjusting the actuator output signal relative to the lateral tape motion signal by enhancing the actuator output signal at low frequencies, i.e., by taking into account the low-frequency characteristics of the lateral tape motion signal.

As the LTM increases with increasing operating tape speed, and thus at higher frequencies, taking into account LTM can include adjusting the actuator output signal at higher frequencies.

According to a further embodiment of the present invention, the track-follow control system includes a skew-follow control system for following a skew of the tape. The skew-follow control system includes a skew controller device for generating a skew control signal as a function of a skew error signal, wherein the skew error signal indicates a difference between the actual skew of the tape and a target skew of the tape relative to the head, and a skew actuator for changing the skew of the head, i.e. the rotation of the head actuator, dependent on the skew control signal.

The skew-follow control system is adapted to pre-determine the skew controller device configuration using a vibration frequency domain profile indicative of environmental vibrations induced to the head and/or the tape drive to determine the skew control signal for adjusting a skew actuator output signal relative to a skew signal indicative of a skew of the tape and to feed back, to an input of the skew-follow control system, a skew feedback signal depending on a difference of the skew actuator output signal and the tape skew signal in order to generate the skew error signal, wherein the skew-follow control system is further adapted to minimize a coupling to the track-follow degree of freedom of the actuator.

The skew control signal is determined such that the skew actuator output signal follows a skew signal indicative of a skew of the tape. The skew follow controller device configuration is further adapted to take into account the coupling of the skew degree of freedom into the track follow degree of freedom, such that the high frequency content of the skew control signal is limited in order to limit coupling into the track following degree of freedom.

The skew-follow control system is constructed in a similar way like the above described track-follow control system. Also similar or identical signals can be used. For instance, the vibration frequency domain profile of the skew-follow control system can be the vibration frequency domain profile as used for the track-follow control.

In tape transport systems, the tape is transported using rollers and reels. As the rollers of some tape drives have no flanges to restrict the lateral motion of the tape, the skew (i.e. the angle of the tape can vary relative to the head). The skew-follow control system can be used to adjust the angle of the head actuator relative to the tape. As a change of the head skew can also add vibrations or disturbances to the remaining parts of the track-follow control system, the skew controller is designed to minimize the coupling to the actuator of the track-follow control system. Thus, the skew actuator output signal can be generated taking into account the influence on the track follow control system.

In addition, the skew-follow control system is designed to account for the delay of the skew adjustment and can be used to determine the skew actuator output signal accordingly.

According to a further embodiment of the present invention, the skew-follow control system is adapted to select a configuration for the skew controller device from a plurality of skew controller device configurations as a function of the operating tape speed. Like the selection of the controller device configuration for the track-follow control, the skew controller device configuration can be chosen in dependence on the operating tape speed. Selecting the skew controller device configuration can be carried out by selecting controller coefficients, which are used to implement the skew controller device. The same operating tape speed can be used for selection of the track-follow control part of the system and the skew-control part. The configuration of the skew controller device can vary with the operating tape speed. For instance, like the configuration of the controller device, the configuration can include bandwidth adjustment for the skew controller device. A set of configurations can be stored and a specific configuration can be chosen in dependence of the selected operating tape speed.

According to a further embodiment of the present invention, the track-follow control system is adapted to select the controller to determine the control signal and to adjust the actuator output signal by using an H-infinity controller configuration.

For using a H∞ or H-infinity controller, the control problem is expressed as a mathematical optimization problem and based on input parameters, such as bandwidth and the controller device, in terms of controller coefficients, is determined by solving this optimization problem. According to the H-infinity controller used for the track-follow control system, the frequency characteristics of the disturbances are included in the control problem formulation. Such an H-infinity approach is suitable to be robust against variations in the system dynamics. However, any other kind of controller can be used.

According to a further embodiment of the present invention, the track-follow control system is adapted to pre-determine configurations for the H-infinity-controller configuration by using weighting functions. The weighting functions can include a first weighting function, a second weighting function, and a third weighting function. The first weighting function can be used for limiting the control current, i.e. the control signal, by applying a low pass filter characteristic. The second weighting function can be used for disturbance rejection, wherein the second weighting function is representative of the frequency characteristics of the vibration specification. The second weighting function is coupled between the vibration signal and the actuator. The third weighting function can be used for increased performance at periodic roller disturbances. Therefore, the third weighting function can include peak filters at specific frequencies.

Two outputs of the H-infinity controller, z1 and z2, are used for solving the optimization problem. z2 corresponds to the control signal after passing the first weighting function and z1 corresponds to the relative head position signal after passing the third weighting function. Using z1 and z2, the controller can be optimized.

A similar H-infinity controller can be used for the skew-follow controller. In this case, the H-infinity controller is used for optimizing the skew-controller.

According to an embodiment of a second aspect of the present invention, a tape transport system is suggested. The tape transport system includes a head operable to read data from and/or write data to the tape and a track-follow control system as described above for controlling the position of the head relative to the tape within the tape transport system.

According to an embodiment of a third aspect of the present invention, a method for controlling the position of a head relative to a tape within a tape transport system is suggested. The method includes:

pre-determining a plurality of controller device configurations depending on a vibration frequency domain profile indicative of environmental vibration induced to the head and the tape;

selecting a configuration for a controller device from the plurality of controller device configurations dependent on an operating tape speed;

generating, by the controller, a control signal as a function of a position error signal, wherein the position error signal indicates a difference between the actual position of the head and a target position of the head relative to the tape; changing, by an actuator, the actual position of the head dependent on the control signal;

determining the control signal for adjusting an actuator output signal relative to a lateral tape motion signal indicative of a lateral motion of the tape; and feeding back, to an input of the track-follow control system, a feedback signal depending on a difference of the actuator output signal and the lateral tape motion signal, in order to generate the position error signal.

According to an embodiment of a fourth aspect of the present invention, a computer program is suggested. The computer program includes a program code for executing the method as described above for controlling the position of a head relative to a tape within a tape transport system when run on at least one computer. The program code can be configured to implement further aspects or steps of the method for allocating energy to devices. The program code can be distributed among the elements forming the system. The computer program product, for instance, includes computer readable code for implementing aspects of the method for controlling the position of a head relative to a tape within a tape transport system depicted above.

Certain embodiments of the presented track-follow control system, the tape transport system, the control method or the computer program can include individual or combined features, method steps or aspects as mentioned above or below with respect to the exemplary embodiments.

In the following, embodiments of methods and devices relating to track-follow control are described with reference to the enclosed drawings.

FIG. 1 shows a tape transport system 100 for transporting a tape 108 in order to perform read, write, seek, or other operations on the tape 108. The tape transport system 100 has a head 114 operable to read data from and/or write data to the tape 108. An outboard reel 113 and an inboard reel 112 are used to transport or move the tape 108 from the outboard reel 113 to the inboard reel 112 in forward direction (FW), and from the inboard reel 112 to the outboard reel 113 in reverse or backward direction (BW). The tape 108 is guided over rollers R1-R4. Sensors 110 and 111 can be used to provide secondary velocities 102, 103 or other reel information measured by the sensors 110 and 111. The secondary velocities 102, 103 correspond to velocities of the tape 108 at the respective reel 112, 113. The sensors 110, 111 can be for example Hall sensors. The arrow FW denotes a nominal forward direction of the tape 108 and BW denotes a movement in the reverse direction. In forward mode, the outboard reel 113 functions as a supply reel. Tape 108 is supplied from the outboard reel 113 via rollers R1, R2 to the head 114 via rollers R3, R4 to the inboard reel 112, which functions as the take-up reel, where tape 108 is wound up again. The tape 108 runs along a forward path as indicated.

The head 114 reads servo information SI from the tape 108. The servo information SI is provided to a servo channel 109. The servo channel 109 provides a primary velocity 101 derived from the servo information SI to a tape-transport control 107. In addition, the servo channel 109 provides data 24 relating to the servo information SI to a track-follow control system 10, which is implemented to adjust the position of the head 114 inter alia in response to this information by forwarding a control signal 15 as actuator input signal 18 to an actuator 12 being coupled to the head 114. The actuator 12, which is described later in greater detail, is controlled by means of the control signal 15. The tape-transport control 107 is adapted to control the inboard reel 112 and the outboard reel 113 via control signals 104, 105. The control signals 104, 105 can include for instance information about the speed of the reels 112, 113.

As a high track density on the tape 108 is desirable in order to achieve a higher capacity, the tolerance in the acceptable position error for read/write operations is relatively low. Thus, a high performance of the track-follow control system 10 is desirable. As already described, the track-follow control system 10 is responsible for controlling and adjusting the position of the head 114 relative to the tape 108. Thus, the track-follow control system 10 reduces the misalignment between the tape 108 and the head 114.

However, other disturbances can occur causing misalignments between the tape 108 and the head 114. Main disturbances in the track-follow control system 10 are the lateral tape motion (LTM) that arises primarily from imperfections in the tape guide rollers R1-R4 and reels 112, 113 and vibration disturbances induced from the outside. The vibration disturbances can be caused by environmental vibrations (for example, like shakes of the tape transport system 100 due to movements of the tape transport system 100 or quakes of the environment like earthquakes).

Figure 2:
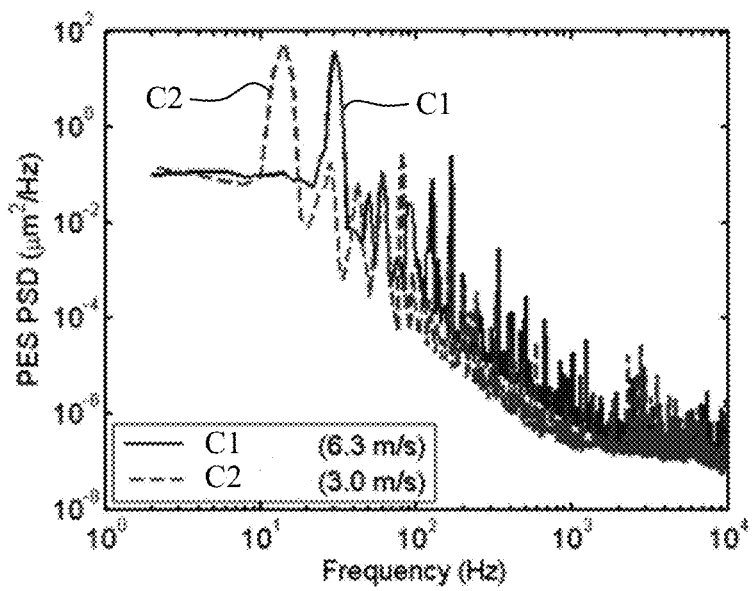
FIG. 2 shows graphs illustrating the power spectral density of lateral tape motion at different speeds.

Exemplary LTMs are shown in FIG. 2. As can be seen, the two curves C1, C2 are examples for different operating speeds of the tape. C1 illustrates an LTM at 6.3 m/s and C2 illustrates an LTM at 3.0 m/s. The diagram shows the position error signal (PES) as power spectral density vs. the frequency. As can be seen, C1 shows an LTM with a peak at about 10 Hz and C2 shows an LTM with a peak at about 50 Hz. These peaks are caused due to reel 112, 113 imperfections. The peak of C1 is at higher frequency compared to the peak of C2 as the LTM is speed-dependent.

Figure 3:
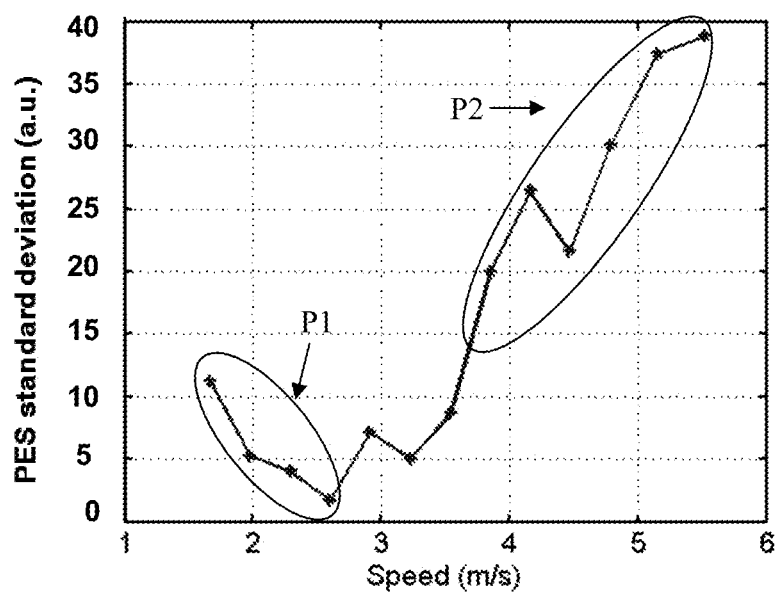
FIG. 3 shows a graph illustrating tape-speed related effects during operation without vibrations.
Figure 4:
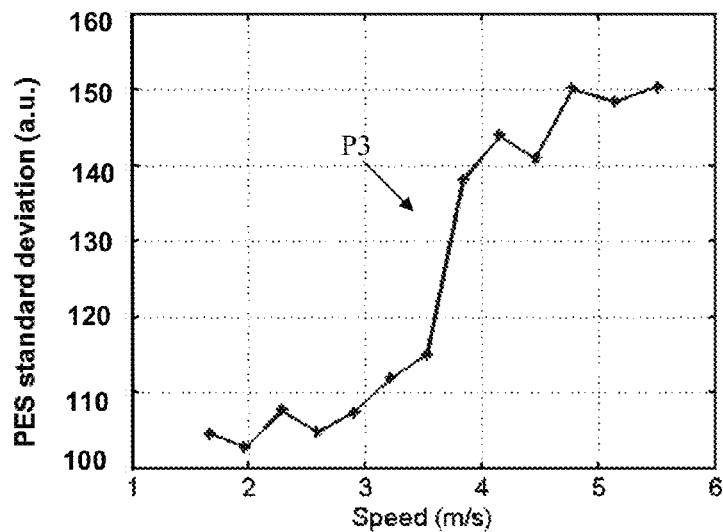
FIG. 4 shows a graph illustrating tape-speed related effects during operation with vibrations.

Operation of the tape transport system 100 at different tape speeds leads to highly diverging requirements of the track-follow control system 10. This is shown in FIGS. 3 and 4. FIGS. 3 and 4 illustrate PES (in arbitrary units) as a function of the tape speed 108, FIG. 3 without additional vibrations from the outside and FIG. 4 with additional vibrations from the outside, i.e. under vibration condition. The disturbances due to LTM when reading the track on the tape increase with increasing tape speed 108. This can be seen in the region P2, where the PES increases with increasing speed. Thus, a high-bandwidth controller device is needed in order to provide the same accuracy when following the track on the tape in this region P2 as the accuracy provided for other tape speeds.

Performance degradation due to a servo pattern delay when reading the track on the tape increases with decreasing speed of the tape 108. This can be seen in the region P1, where the PES increases with decreasing speed. The servo pattern delay refers to the fact that the servo pattern arrives later at the position of the head 114 than needed. Thus, the servo pattern is delayed. For this case, a low-bandwidth controller device is needed to avoid closed-loop disturbance amplification.

FIG. 4 shows PES as a function of the tape speed 108 under vibration condition. In addition to disturbances due to servo pattern delay and LTM, vibrations can be induced to the tape transport system 100 from the outside. The PES in such a case is shown in FIG. 4 for different speeds. As can be seen, in particular in region P3 of the curve, vibration coupling effects are increased with increasing tape speed. In comparison with FIG. 3, the PES is higher at all speeds. In this case, a high-bandwidth controller device is needed at all speeds.

Thus, reliable track-follow operation within the tape transport system 100 is required not only for system delay (i.e. servo pattern delay due to system characteristics) and LTM, but is also required under specific vibration conditions. In the following, a tape-speed-optimized track-follow control system 10 is shown that addresses the conflicting requirements created due to an operation at different tape speeds.

Figure 5:
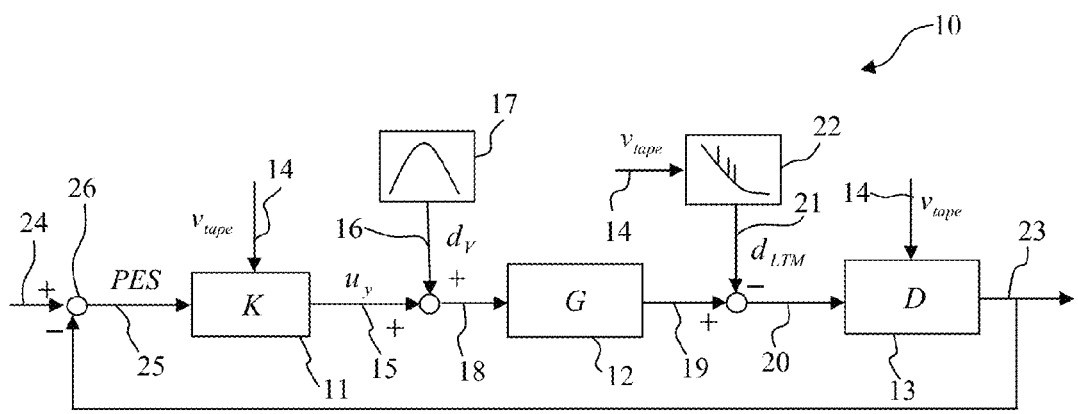
FIG. 5 shows a schematic block diagram of a model of a first embodiment of a track-follow control system.

FIG. 5 shows a track-follow control system 10 according to an embodiment of the present invention. The track-follow control system 10 is arranged in a close-loop configuration. The track follow control system 10 receives at an input 26 the track reference 24 from the servo channel module. The PES 25, which is forwarded to the controller device 11, is calculated as a function (for instance by addition or subtraction) of the track reference 24 and a feedback signal 23. The feedback signal 23 is calculated in the track-follow control system 10 and includes information about an estimated relative position of the actuator 12 and therefore information about an estimated position of the head 114 with respect to the tape position. This feedback signal 23 can also be used in other parts of the tape transport system 100 and is therefore outputted.

In the following, the closed-loop control of the track-follow control system 10 is described. Dependent on the operating tape speed 14 (also called $V_{tape}$) and the PES 25, a configuration (for example bandwidth) for the controller device 11 is selected. The position error signal (PES) 25 that is dependent on preformatted servo patterns provides a measure of the error between the target track location (i.e. track reference) on the tape 108 and the head position. The selection of the configuration of the controller device 11 includes a selection of controller coefficients. These coefficients are responsible for the characteristics of the controller device 11. Thus, for different speeds 14, different controller device configurations can be chosen. As the selection of the configuration of the controller device 11 depends on the operating tape speed 14, the selection of the controller device configuration can be changed when the speed 14 changes. Thus, each controller device 11 uses the system characteristics for the relevant operating tape speed 14.

A re-selection of the controller device configuration can be repeated periodically. Alternatively, the re-selection of the configuration of the controller device 11 can be repeated as soon as the operating tape speed 14 changes or changes within predefined limits.

The controller device 11 outputs a control signal 15. The control signal 15 is a control current $u_y$ for controlling an actuator 12. In particular, the control current $u_y$ includes a control signal for a movement of the head 114 in y direction, i.e. in a lateral direction with respect to a movement or extension of the tape 108.

In the case of environmental vibrations, the position of the actuator 12 is further dependent on a vibration signal 16 ($d_v$). The vibration signal 16 is dependent on a vibration frequency domain profile 17. This profile 17 includes estimated standard vibrations for different tape transport systems 100, for instance taking into account environmental vibrations caused due to the location of the tape transport system 100. The vibration signal 16 needs to be compensated across all speeds 14. The controller 11 determines the control signal 15 taking into account the vibration frequency domain profile 17. Therefore, the controller device 11 enhances the performance under vibrations over all speeds 14 without the need to increase the bandwidth of the controller device 11.

The actuator 12 positions the head 114 due to the control signal 15. The actuator output signal 19 includes information about the actual head position. This actuator output signal 19 follows a LTM signal 21 ($d_{LTM}$). The LTM signal 21 includes frequency characteristics of the LTM. The LTM signal 21 is dependent on disturbance data models 22. The disturbance rejection data models 22 includes information about specific disturbances to be rejected or attenuated which are induced to the tape due to rollers R1-R4 and reels 112, 113 of the tape transport system 100. The disturbance data models 22 have an enhanced amplitude at specific frequencies. These frequencies correspond to roller rotation frequency and harmonics. The frequency areas of the enhanced disturbance characteristics 22 are different for each operating tape speed 14. Therefore, the disturbance model 22 has as an input the operating tape speed 14.

The difference (as signal 20) of the actuator output signal 19 and the LTM signal 21 is measured by the servo channel. A system delay unit 13 is used to model the system delay. This system delay unit 13 is optional and can be omitted. Dependent on the operating tape speed 14, the system delay unit 13 is a speed dependent model of the system delay and affects the relative head position 20 in order to generate a feedback signal 23. The system delay, i.e. the delay caused by the overall system, includes a servo pattern delay, which is speed-dependent and depends on the servo pattern format and the tape speed 14, and a sampling time or actuator driver delay, which is speed-independent and depends on the processing or operating speed of the head and the actuator.

The feedback signal 23, which includes information of an estimated relative position of the head actuator with respect to the tape, is supplied to the input of the closed-loop of the track-follow control system 10. As a function of the feedback signal 23 and a track reference 24, the PES 25 is determined which is supplied to the controller device 11 as input. The track reference 24 includes information in view of the target position of the head 114, i.e. at which location of the servo pattern the head 114 should be positioned.

The controller device 11, the actuator 12 and the system delay unit 13 each include logic units K, G and D. These logic units can be transfer functions used in a control system.

Using the track-follow control system 10, the control effort can be enhanced at the areas where needed without increasing the overall bandwidth. The use of speed dependent delay models, i.e. a calculated system delay due to servo pattern delay, improves the performance at the lower tape speeds having more delay. Combining the lateral tape motion disturbance using the disturbance rejection data models 22 and the frequency domain profile 17 eliminates the need for switching controllers or additional enhancements like disturbance observers.

Figure 6:
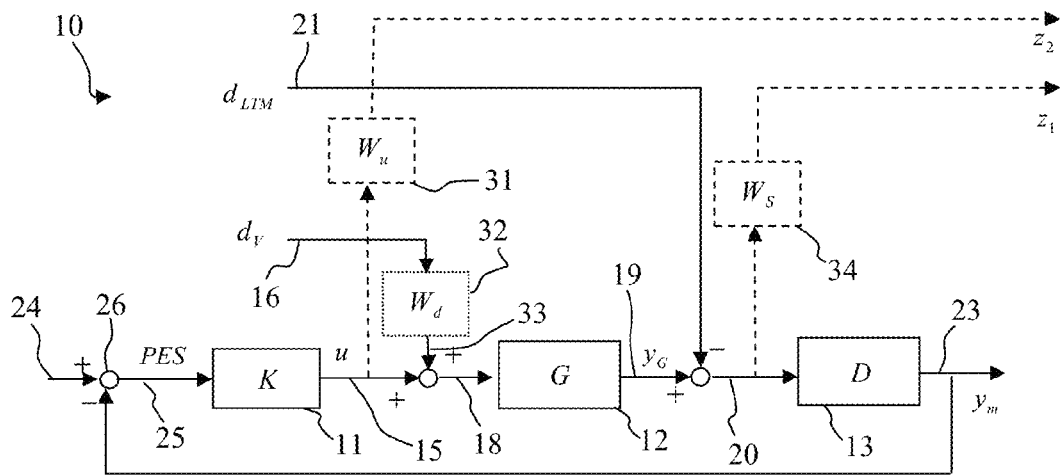
FIG. 6 shows a schematic block diagram of a system model for deriving a track-follow control system using an H-infinity controller according to an embodiment of the present invention.

An embodiment of the track-follow control system 10 using an H-infinity controller is shown in FIG. 6. Here, the controller device configuration 11 is selected dependent on a mathematical optimization problem. Performance measures are defined in terms of weighting functions 31, 32, 34 and the optimal controller device 11 is a controller device 11 which satisfies the performance measures. The mathematical optimization problem includes two output signals z1 and z2 of the track-follow control system 10. Using the outputs z1, z2 and solving a mathematical optimization problem, the selection of the controller device configuration 11 can be monitored and optimized.

Figure 9:
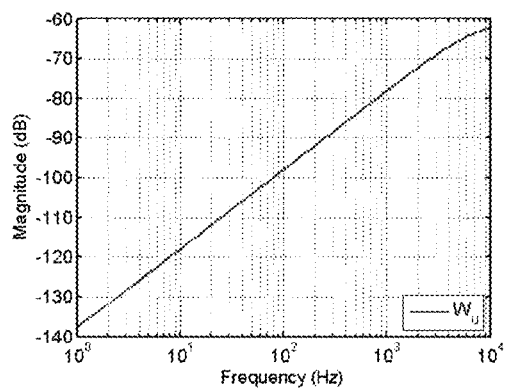

The first output z2 corresponds to the control signal 15 after passing the weighting function 31 ($W_e$). The control signal 15 is limited by applying a low pass filter characteristic in the $1/W_u$ weighting function 31. The weighting function 31 is shown in FIG. 9.

Figure 7:
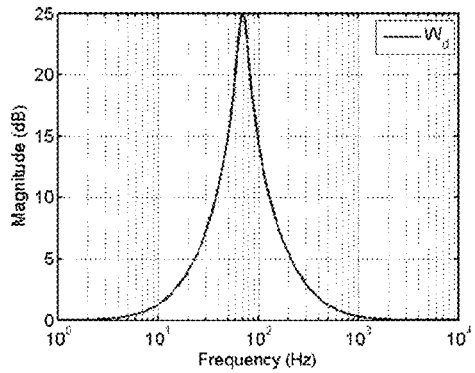
FIGS. 7-9 show weighting functions used in the design of the H-infinity controllers according to an embodiment of the present invention.

The vibration signal 16 is adjusted dependent on the second weighting function 32 ($W_d$) shown in FIG. 7. Disturbance rejection is enhanced at ~70 Hz to improve performance under vibration conditions. The controller 11 of the track-follow control system 10 is designed based on a weighting function 32 ($W_d$) which is representative of the frequency characteristics of the applied vibration.

Figure 8:
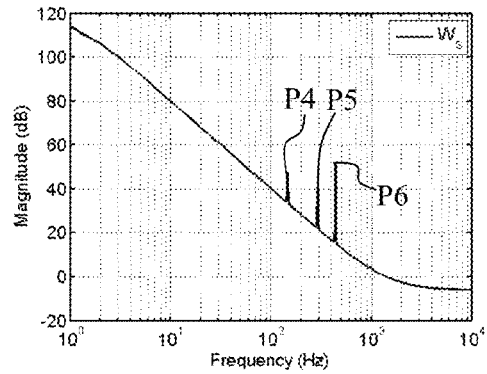

The second output z1 depends on the relative head position signal 20 after passing the third weighting function 34 ($W_S$) shown in FIG. 8. Three peak filters are included in the $W_S$ weighting function 34 for increased performance at three roller periodic disturbances. The three peak filters can be seen in FIG. 8 as the three peaks P4, P5, P6.

The weighting functions 31, 32, 34 and the delay model in the delay calculation unit 13 depend on the operating tape speed 14. Thus, for different operating tape speeds 14, different weighting functions and different delay models are used.

Figure 10:
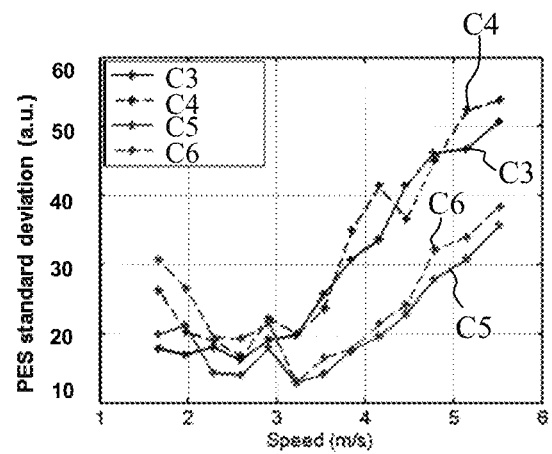
FIG. 10 shows graphs illustrating PES deviation using a common track-follow controller and using the track-follow control system of FIG. 6 without vibrations.

FIG. 10 shows experimental results using the H-infinity controller 10 of FIG. 6 without additional vibrations, i.e. under normal condition. As can be seen in FIG. 10, the curves C3 (forward direction) and C4 (backward direction) show a track-following control using a standard controller and the curves C5 (forward direction) and C6 (backward direction) show a track-following control using the H-infinity controller 10 of FIG. 6. As can be seen, the PES standard deviation (in arbitrary units) is smoothed, i.e. has lesser variations, using the H-infinity controller 10 of FIG. 6 compared to the PES standard deviation using the standard controller. At a speed above 3 m/s, PES curves C5, C6 are decreased in comparison to curves C3 and C4 of the standard controller.

Figure 11:
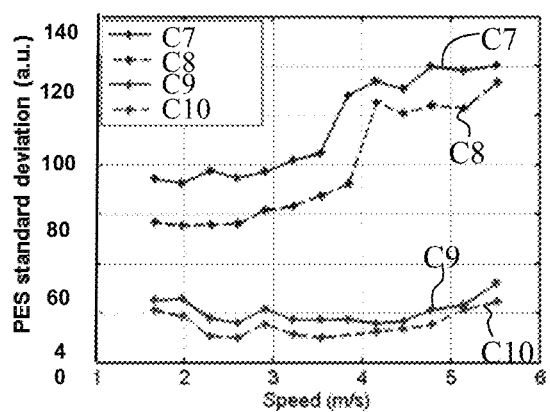
FIG. 11 shows graphs illustrating PES deviation using a common track-follow controller and using the track-follow control system of FIG. 6 with vibrations.

FIG. 11 shows experimental results using the H-infinity controller 10 of FIG. 6 with additional vibrations, i.e. under vibration condition. As can be seen in FIG. 11, the curves C7 (forward direction) and C8 (backward direction) show a track-following control using a standard controller and the curves C9 (forward direction) and C10 (backward direction) show a track-following control using the H-infinity controller 10 of FIG. 6. The PES standard deviation (in arbitrary units) is smoothed using the H-infinity controller 10 of FIG. 6 compared to the PES standard deviation using the standard controller. For all speeds, the PES of curves C9 and C10 of the H-infinity controller 10 of FIG. 6 is decreased in comparison to curves C7 and C8 of the standard controller.

Figure 12:
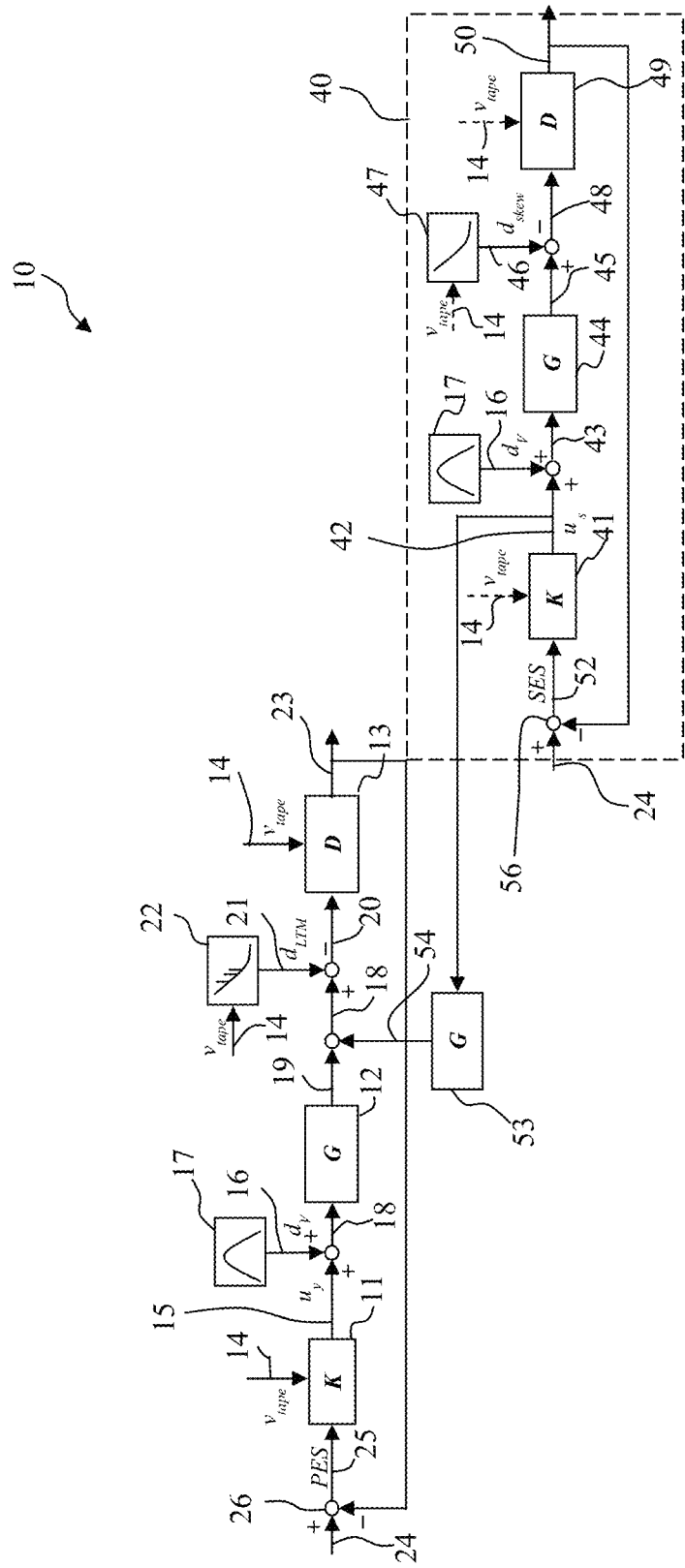
FIG. 12 shows a schematic block diagram of a system model for deriving a third embodiment of a track-follow control system including a skew-follow control system.

The track-follow control system 10 can also include a skew-follow control system 40 as shown in FIG. 12. The skew-follow control system 40 is used for following the skew of the tape 108.

During operation of the tape transport system 100, in particular during transport of the tape 108, the skew, i.e. the skew angle, of the tape 108 can vary. Skew angle in this context refers to an angle of the tape 108 in transport direction relative to the head. In order to follow the skew of the tape 108, the skew-follow control system 40 is provided.

Like the track-follow control system 10 including a controller device 11, the skew-follow control system 40 includes a skew controller device 41. The same configuration of the skew controller device 41 can be used for all speeds 14. In an optional embodiment of the present invention, a configuration for the skew controller device 41 can be selected from a plurality of skew controller device configurations dependent on the operating tape speed 14 (also called $v_{tape}$). The skew controller device 41 generates a skew control signal 42 ($u_s$). Dependent on this skew control signal 42 as skew actuator input signal 43, a skew actuator 44 can be operated.

However, in order to account for environmental vibrations, the skew control signal 42 is determined taking into account the vibration frequency domain profile 17. The vibration frequency domain profile 17 corresponds to the vibration profile 17 used in the track-follow control system 10.

The skew control signal 42 is supplied to the skew actuator 44. The skew actuator 44 changes the angle of the head actuator 12 and outputs a skew actuator output signal 45. This skew actuator output signal 45 includes information about the rotation of the head actuator and must follow a tape skew signal 46 ($d_{skew}$). The skew signal 46 includes frequency characteristics of the skew. The skew signal 46 depends on a disturbance model 47, in particular including a low-pass filter. As the skew variation increases with higher speeds 14, the disturbance model 47 is speed dependent. Therefore, the disturbance model 47 has as an input the operating tape speed 14. Further, the disturbance model 47 is enhanced at frequencies corresponding to the skew frequency characteristics.

The difference of the skew actuator output signal and the tape skew 48, i.e. the relative head skew, is measured by the servo channel. A system delay unit 49 is used to model the system delay. Like the system delay unit 13 for the track-follow control, the system delay unit 49 is optional and can be omitted. Further, the system delay unit 13 for the track-follow control part of the track-follow control system 10 and the system delay unit 49 for the skew-follow control can be similar or be the same. Dependent on the operating tape speed 14, the system delay unit 49 calculates a model of the system delay, like the system delay unit 13, and affects the relative skew actuator output signal 48 in order to generate a skew feedback signal 50. The system delay includes a servo pattern delay which is speed-dependent and a sampling time or actuator delay which is speed-independent.

The skew feedback signal 50 is supplied to further parts of the tape transport system 100 and to the input 56 of the closed-loop of the skew-follow control system 40. As a function of the skew feedback signal 50 and the track reference 24, the SES (skew error signal) 52 is determined which is supplied to the skew controller device 41 as input.

In addition, the skew control signal 42 is coupled to the track-follow control part via a coupling unit 53. The coupling unit 53 affects the actuator output signal 19 using the coupling unit output signal 54 which depends on the skew control signal 42 or can be the skew control signal 42. Due to this coupling, the track-follow control system 10 considers also the angle of the head 114 which can contribute to a misalignment of the tape 108 relative to the head 114.

Figure 13:
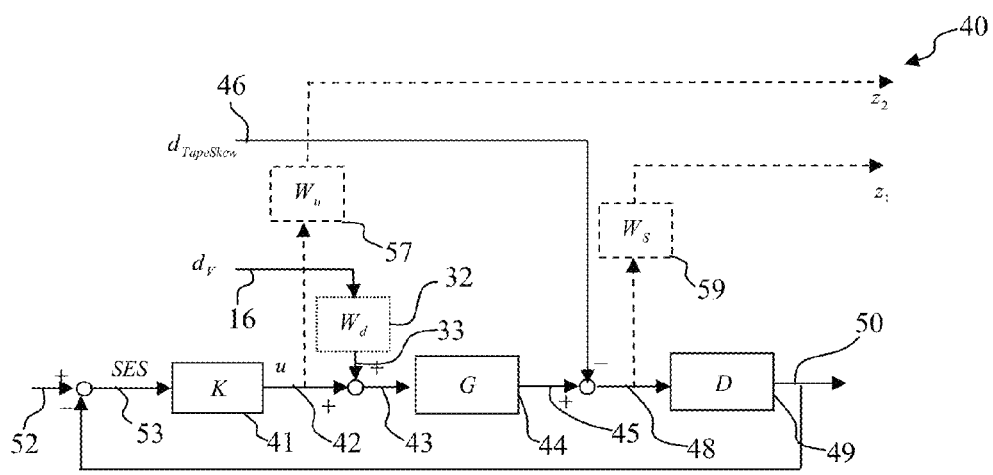
FIG. 13 shows the system model used to derive a skew-follow control system using an H-infinity controller according to an embodiment of the present invention.

An implementation of the skew-follow control system 40 using an H-infinity controller is shown in FIG. 13. Here, the skew controller device 41 configuration is selected dependent on a mathematical optimization problem. Like in the H-infinity controller device configuration for the track-follow control system 10 as shown in FIG. 6, performance measures are defined in terms of weighting functions 57, 59, 32 and the optimal configuration for the skew controller device 41 is a configuration which satisfies the performance measures. The mathematical optimization problem includes two outputs z1, z2 of the skew-follow control system 40. Using the outputs z1, z2, the selection of the controller device configuration 41 can be monitored and optimized.

The first output z2 corresponds to the skew control signal 42 after passing the weighting function 57 ($W_e$). The skew control current 42 is limited by applying a low pass filter characteristic in the $1/W_u$ weighting function 57.

The vibration signal 16 is adjusted dependent on the second weighting function 32 ($W_d$) shown in FIG. 7, wherein the adjusted vibration signal 33 is added to the control signal 15. Disturbance rejection is enhanced at ~40 Hz to improve performance under vibration conditions. This disturbance rejection is added to the problem formulation by an additional external input of the vibration signal 16 and a weighting function 32 ($W_d$) which is representative of the frequency characteristics of the applied vibration.

The second output z1 depends on the adjusted skew actuator output signal 48 after passing the third weighting function 59 ($W_S$). The $W_S$ weighting function 59 is applied for increased performance at the frequencies of the tape skew disturbance.

The weighting functions 57, 59, 32 and the delay model in the system delay unit 49 depend on the operating tape speed 14. Thus, for different operating tape speeds 14, different weighting functions 57, 59, 32 and different delay models are used.

Figure 14:
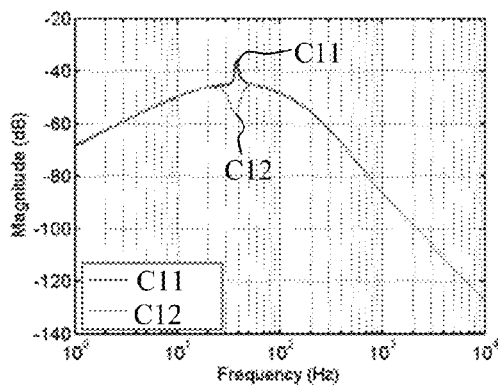
FIGS. 14 and 15 show graphs illustrating transfer functions using the skew-follow control system of FIG. 13 with the vibration profile and without the vibration profile for determining the control configuration.
Figure 15:
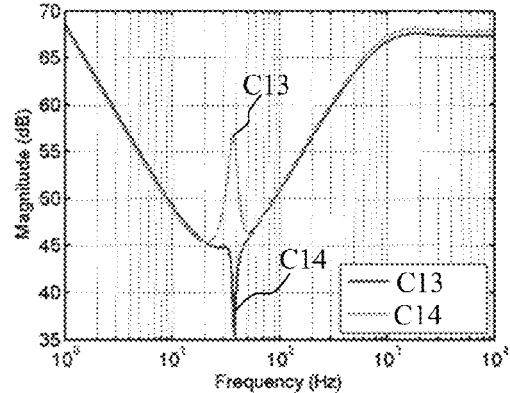

FIGS. 14 and 15 show a transfer function from the external disturbances to the SES using the weighting function 32 (C12, C14) and without weighting function 32 (C11, C13). As can be seen, the resonance peak is suppressed in the version of the control design with the weighting function 32 (C12, C14).

Figure 16:
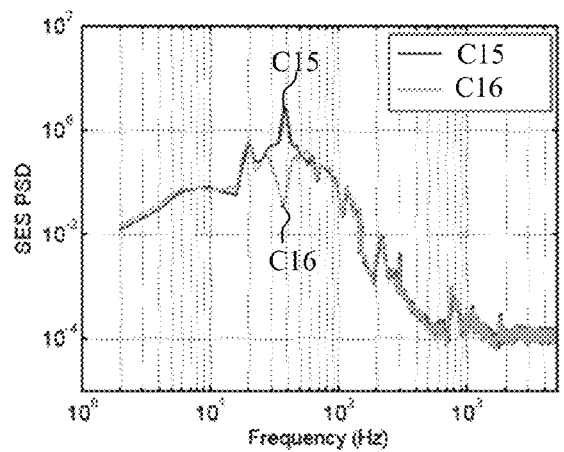
FIG. 16 shows graphs illustrating the skew-error signal under vibration conditions using the skew-follow control system of FIG. 13 with the vibration profile and without the vibration profile for determining the control configuration.

FIG. 16 illustrates the skew-error signal under vibration conditions using the skew-follow control system of FIG. 13 with the vibration profile (C16) and without the vibration profile (C15) for determining the control configuration. As can be seen, in particular about 40 Hz, the skew-follow controller 40 using the weighting function 32 compensates for the vibration disturbances around the resonance.

Figure 17:
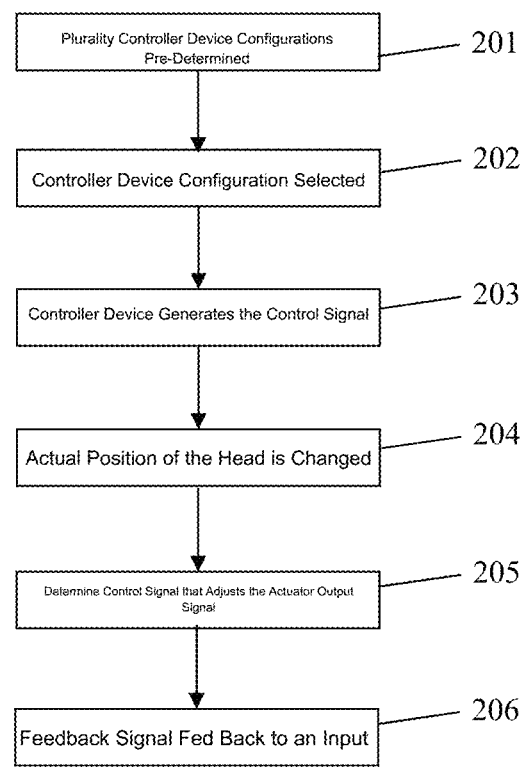
FIG. 17 shows a sequence of method steps for controlling the position of head relative to a tape within a tape transport system according to an embodiment of the present invention.

A method for operating an above described track-follow control system 10 is shown in FIG. 17. In step 201, a plurality of controller device configurations are pre-determined, i.e. prior to the operation of the tape transport and corresponding track-follow control, depending on a vibration frequency domain profile indicative of environmental vibrations induced to the head and the tape. Thus, disturbances influencing the misalignment between head 114 and tape 108 are considered when adjusting the position of the head 114.

In step 202, a controller device configuration is selected from the plurality of controller device configurations dependent on the operating tape speed 14. The controller device configuration can depend on a selection of controller coefficients as described above.

In step 203, the controller device 11 generates the control signal 15 as a function of the position error signal 25. The position error signal 25 describes a difference between the actual position of the head 114 and a target position of the head 114 relative to the tape 108. As described, it is important for higher track densities that the misalignment between tracks on the tape 108 and the head 114 is reduced. This is achieved due to the closed-loop control as provided by the described method where different vibrations are taken into account when generating the control signal 15 for the actuator 12.

In step 204, the actual position of the head 114 is changed dependent on the control signal 15. As the track-follow control is a closed-loop control, in step 205, the control signal that adjusts the actuator output signal 19 relative to the lateral tape motion signal 21 being indicative of a lateral motion of the tape 108 is determined. A feedback signal 23, which depends on the difference of the actuator output signal 19 and the lateral tape motion signal 21, is fed back in step 206 to an input of the track-follow control system 10 in order to generate the position error signal 25. The feedback signal 23 can also be used in other parts of the tape transport system 100. Due to the feedback path, the control of the head position can be improved accounting for an actual position of the head 114 and motion of the tape 108 as well as controlling of the position of the head 114.

The above described method and also the track-follow control system 10 can be implemented using computerized devices which can be suitably designed for implementing embodiments of the present invention as described herein. In that respect, it can be appreciated that the methods described herein are largely non-interactive and automated. In exemplary embodiments of the present invention, the method described herein can be implemented either in an interactive, partly-interactive or non-interactive system. The method described herein can be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of the above method of FIG. 17 or the track-follow control system 10, e.g. of FIG. 5, can be implemented in software, as an executable program, the latter executed by suitable digital processing devices. More generally, embodiments of the present invention can be implemented by general-purpose digital computers, such as personal computers, workstations, etc., are used.

Figure 18:
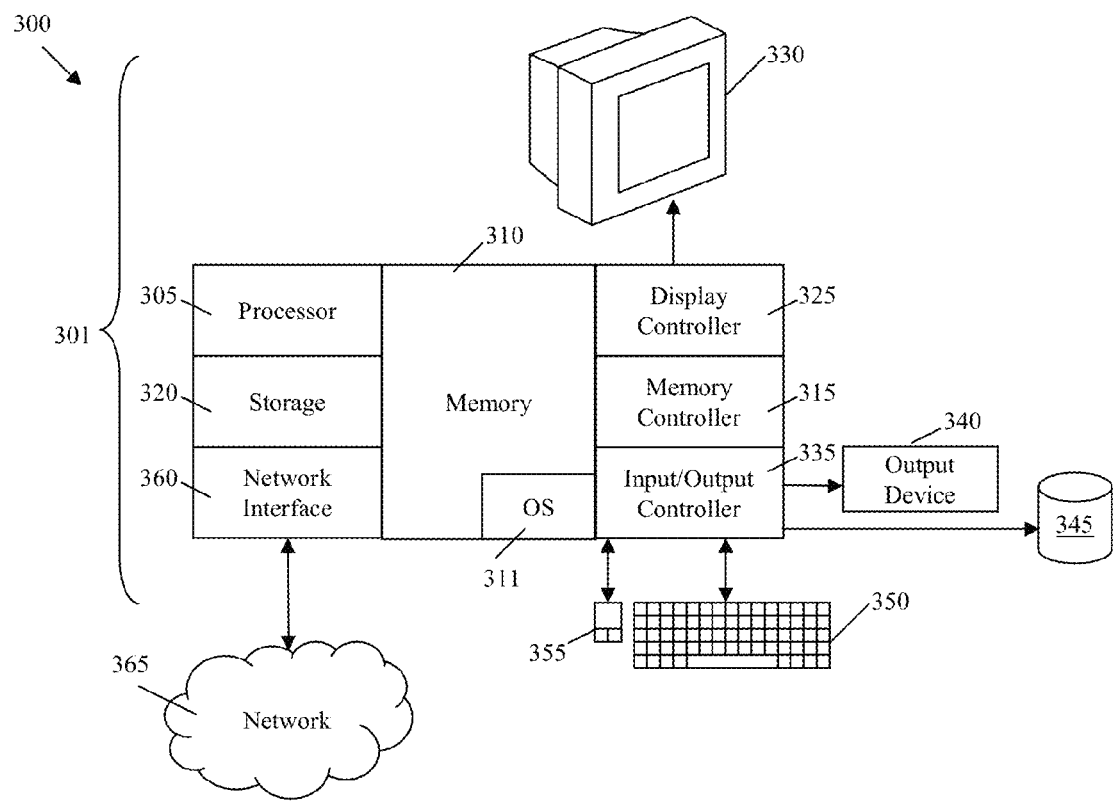
FIG. 18 shows a schematic diagram of a system adapted for controlling the position of the head according to an embodiment of the present invention.

For instance, the system 300 depicted in FIG. 18 schematically represents a computerized unit 301, e.g., a general-purpose computer. In exemplary embodiments, in terms of hardware architecture, as shown in FIG. 18, the unit 301 includes a processor 305, memory 310 coupled to a memory controller 315, and one or more input and/or output (I/O) devices 340, 345, 350, 355 (or peripherals) that are communicatively coupled via a local input/output controller 335. The input/output controller 335 can be, but is not limited to, one or more buses or other wired or wireless connections, as is known in the art. The input/output controller 335 can have additional elements, which are omitted for simplicity, such as controllers, buffers (caches), drivers, repeaters, and receivers, to enable communications. Further, the local interface can include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), or generally any device for executing software instructions.

The memory 310 can include any one or combination of volatile memory elements (e.g., random access memory) and nonvolatile memory elements. Moreover, the memory 310 can incorporate electronic, magnetic, optical, and/or other types of storage media. Note that the memory 310 can have a distributed architecture, where various components are situated remote from one another, but can be accessed by the processor 305. For instance, different configurations for the controllers 11, 41 or frequency domain profiles or other data can be stored in the memory 310.

The software in memory 310 can include one or more separate programs, each of which includes an ordered listing of executable instructions for implementing logical functions. In the example of FIG. 18, the software in the memory 310 includes methods described herein in accordance with exemplary embodiments and a suitable operating system (OS) 311. The OS 311 essentially controls the execution of other computer programs, such as the method as described herein (e.g., FIG. 17) or the track-follow control system 10 as described herein (e.g. FIG. 5), and provides scheduling, input-output control, file and data management, memory management, and communication control and related services.

The methods described herein can be in the form of a source program, executable program (object code), script, or any other entity including a set of instructions to be performed. When in a source program form, then the program needs to be translated via a compiler, assembler, interpreter, or the like, as known per se, which can or may not be included within the memory 310, so as to operate properly in connection with the OS 311. Furthermore, the methods can be written as an object oriented programming language, which has classes of data and methods, or a procedure programming language, which has routines, subroutines, and/or functions.

Possibly, a conventional keyboard 350 and mouse 355 can be coupled to the input/output controller 335. Other I/O devices 340-355 can include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 335 for further processing. Sensor nodes are ideally small, consume low energy, are autonomous and operate unattended.

In addition, the I/O devices 340-355 can further include devices that communicate both inputs and outputs. The system 300 can further include a display controller 325 coupled to a display 330. In exemplary embodiments, the system 300 can further include a network interface or transceiver 360 for coupling to a network 365. For instance, the tape transport system 100 of FIG. 1 can be controlled via a network 365 when used in a tape library.

The network 365 transmits and receives data between the unit 301 and external systems. The network 365 is possibly implemented in a wireless fashion, e.g., using wireless protocols and technologies, such as WiFi, WiMax, etc. The network 365 can be a fixed wireless network, a wireless local area network (LAN), a wireless wide area network (WAN) a personal area network (PAN), a virtual private network (VPN), intranet or other suitable network system and includes equipment for receiving and transmitting signals.

The network 365 can also be an IP-based network for communication between the unit 901 and any external server, client and the like via a broadband connection. In exemplary embodiments, network 365 can be a managed IP network administered by a service provider. Besides, the network 365 can be a packet-switched network such as a LAN, WAN, Internet network, etc.

If the unit 301 is a PC, workstation, intelligent device or the like, the software in the memory 310 can further include a basic input output system (BIOS). The BIOS is stored in ROM so that the BIOS can be executed when the computer 301 is activated. The track-follow control system 10 can be part of the unit 301.

When the unit 301 is in operation, the processor 305 is configured to execute software stored within the memory 310, to communicate data to and from the memory 310, and to generally control operations of the computer 301 pursuant to the software. The methods described herein and the OS 311, in whole or in part are read by the processor 305, typically buffered within the processor 305, and then executed. When the method described herein (e.g. with reference to FIG. 17) is implemented in software, the method can be stored on any computer readable medium, such as storage 320, for use by or in connection with any computer related system or method.

As is appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects. Furthermore, aspects of the present invention can take the form of a computer program product embodied in one or more computer readable medium(s) having computer readable program code embodied thereon. Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the unit 301, partly thereon, partly on a unit 301 and another unit 301, similar or not.

Aspects of the present invention are described above with reference to flowchart illustrations and/or block diagrams of methods, apparatus (systems) and computer program products according to embodiments of the invention. Understand that each block of the flowchart illustrations and/or block diagrams can be implemented by one or more computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and diagrams in the figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved and algorithm optimization. Note that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

More generally, while the present invention has been described with reference to certain embodiments, it is understood by those skilled in the art that various changes can be made and equivalents can be substituted without departing from the scope of the present invention. In addition, many modifications can be made to adapt a particular situation to the teachings of the present invention without departing from its scope. Therefore, it is intended that the present invention not be limited to the particular embodiments disclosed, but that the present invention can include all embodiments falling within the scope of the appended claims.

We claim:

1. A track-follow control system for controlling the position of a head relative to a tape within a tape transport system, the track-follow control system comprising:
    a controller device for generating a control signal as a function of a position error signal, wherein the position error signal indicates a difference between an actual position of the head and a target position of the head relative to the tape; and
    an actuator for changing the actual position of the head dependent on the control signal;
    wherein the track-follow control system is adapted to:
        select a configuration for the controller device from a plurality of configurations dependent on an operating tape speed, wherein the plurality of controller device configurations are pre-determined depending on a vibration frequency domain profile indicative of environmental vibrations induced to the head and the tape;
        determine the control signal for adjusting an actuator output signal relative to a lateral tape motion signal indicative of a lateral motion of the tape; and
        feed-back, to an input of the track-follow control system, a feedback signal depending on a difference of the actuator output signal and the lateral tape motion signal in order to generate the position error signal.

2. The track-follow control system according to claim 1, wherein the track-follow control system is adapted to select a configuration for the controller device such that a controller coefficient is adjusted dependent on the operating tape speed.

3. The track-follow control system according to claim 1, wherein the track-follow control system is adapted to determine the control signal such that the actuator output signal follows the lateral tape motion signal.

4. The track-follow control system according to claim 1, wherein the track-follow control system is adapted to pre-determine the controller device configuration depending on a system delay using a system delay model.

5. The track-follow control system according to claim 4, wherein the track-follow control system is adapted to calculate the system delay as a function of a servo pattern delay of the tape and an actuator delay.

6. The track-follow control system according to claim 1, wherein the track-follow control system is adapted to determine the control signal by adjusting the actuator output signal relative to the lateral tape motion signal by enhancing the actuator output signal at predefined frequencies.

7. The track-follow control system according to claim 6, wherein the predefined frequencies include roller rotation frequencies and/or harmonics of these frequencies.

8. The track-follow control system according to claim 6, wherein the predefined frequencies depend on the operating tape speed.

9. The track-follow control system according to claim 1, wherein the track-follow control system is adapted to determine the control signal by adjusting the actuator output signal relative to the lateral tape motion signal by enhancing the actuator output signal at low frequencies.

10. The track-follow control system according to claim 1, further comprising a skew-follow control system for following a skew of the tape, the skew-follow control system comprising:
a skew controller device for generating a skew control signal as a function of a skew error signal, wherein the skew error signal indicates a difference between the actual skew of the tape and a target skew of the tape relative to the head; and
a skew actuator for changing the skew of the head dependent on the skew control signal;
wherein the skew-follow control system is adapted to:
pre-determine a skew controller device configuration using a vibration frequency domain profile indicative of environmental vibrations induced to the head;
determine the skew control signal for adjusting a skew actuator output signal relative to a skew signal indicative of a skew of the tape; and
feed-back, to an input of the skew-follow control system, a skew feedback signal depending on a difference of the skew actuator output signal and the tape skew signal in order to generate the skew error signal; and
wherein the skew-follow control system is further adapted to minimize a coupling to a track-follow degree of freedom of the actuator.

11. The track-follow control system according to claim 10, wherein the skew-follow control system is adapted to select a configuration for the skew controller device from a plurality of skew controller device configurations as a function of the operating tape speed.

12. The track-follow control system according to claim 1, wherein the track-follow control system is adapted to select the controller device to determine the control signal and to adjust the actuator output signal by using an H-infinity controller configuration.

13. The track-follow control system according to claim 12, wherein the track-follow control system is adapted to pre-determine configurations for the H-infinity-controller configuration by using a plurality of weighting functions.

14. A tape transport system, comprising:
a head operable to read data from and/or write data to a tape; and
a track-follow control system for controlling the position of the head relative to the tape, the track-follow control system comprising:
a controller device for generating a control signal as a function of a position error signal, wherein the position error signal indicates a difference between an actual position of the head and a target position of the head relative to the tape; and
an actuator for changing the actual position of the head dependent on the control signal;
wherein the track-follow control system is adapted to:
select a configuration for the controller device from a plurality of configurations dependent on an operating tape speed, wherein the plurality of controller device configurations are pre-determined depending on a vibration frequency domain profile indicative of environmental vibrations induced to the head and the tape;
determine the control signal for adjusting an actuator output signal relative to a lateral tape motion signal indicative of a lateral motion of the tape; and
feed-back, to an input of the track-follow control system, a feedback signal depending on a difference of the actuator output signal and the lateral tape motion signal in order to generate the position error signal.

15. The tape transport system according to claim 14, wherein the track-follow control system is adapted to select a configuration for the controller device such that a controller coefficient is adjusted dependent on the operating tape speed.

16. The tape transport system according to claim 14, wherein the track-follow control system is adapted to determine the control signal such that the actuator output signal follows the lateral tape motion signal.

17. The tape transport system according to claim 14, further comprising a skew-follow control system for following a skew of the tape, the skew-follow control system comprising:
a skew controller device for generating a skew control signal as a function of a skew error signal, wherein the skew error signal indicates a difference between the actual skew of the tape and a target skew of the tape relative to the head; and
a skew actuator for changing the skew of the head dependent on the skew control signal;
wherein the skew-follow control system is adapted to:
pre-determine a skew controller device configuration using a vibration frequency domain profile indicative of environmental vibrations induced to the head;
determine the skew control signal for adjusting a skew actuator output signal relative to a skew signal indicative of a skew of the tape; and
feed-back, to an input of the skew-follow control system, a skew feedback signal depending on a difference of the skew actuator output signal and the tape skew signal in order to generate the skew error signal; and
wherein the skew-follow control system is further adapted to minimize a coupling to a track-follow degree of freedom of the actuator.

18. The tape transport system according to claim 17, wherein the skew-follow control system is adapted to select a configuration for the skew controller device from a plurality of skew controller device configurations as a function of the operating tape speed.

19. A method for controlling the position of a head relative to a tape within a tape transport system, the method comprising:
pre-determining a plurality of controller device configurations depending on a vibration frequency domain profile indicative of environmental vibrations induced to the head and the tape;
selecting a configuration for a controller device from the plurality of configurations dependent on an operating tape speed;
generating, by the controller device, a control signal as a function of a position error signal, wherein the position error signal indicates a difference between an actual position of the head and a target position of the head relative to the tape;
changing, by an actuator, the actual position of the head dependent on the control signal;
determining the control signal for adjusting an actuator output signal relative to a lateral tape motion signal indicative of a lateral motion of the tape; and
feeding back, to an input of the track-follow control system, a feedback signal depending on a difference of the actuator output signal and the lateral tape motion signal in order to generate the position error signal.

20. A computer program product for controlling the position of a head relative to a tape within a tape transport system, the computer program product comprising a computer readable storage medium having program instructions embodied therewith, wherein the computer readable storage medium is not a transitory signal per se, the program instructions readable/executable by a computer device to cause the computer device to perform a method comprising:
- pre-determining a plurality of controller device configurations depending on a vibration frequency domain profile indicative of environmental vibrations induced to the head and the tape;
- selecting a configuration for a controller device from the plurality of configurations dependent on an operating tape speed;
- generating, by the controller device, a control signal as a function of a position error signal, wherein the position error signal indicates a difference between an actual position of the head and a target position of the head relative to the tape;
- changing, by an actuator, the actual position of the head dependent on the control signal;
- determining the control signal for adjusting an actuator output signal relative to a lateral tape motion signal indicative of a lateral motion of the tape; and
- feeding back, to an input of the track-follow control system, a feedback signal depending on a difference of the actuator output signal and the lateral tape motion signal in order to generate the position error signal.

* * * * *